(No Model.)
W. FOX.
TIRE FOR VEHICLES.
No. 375,281. Patented Dec. 20, 1887.
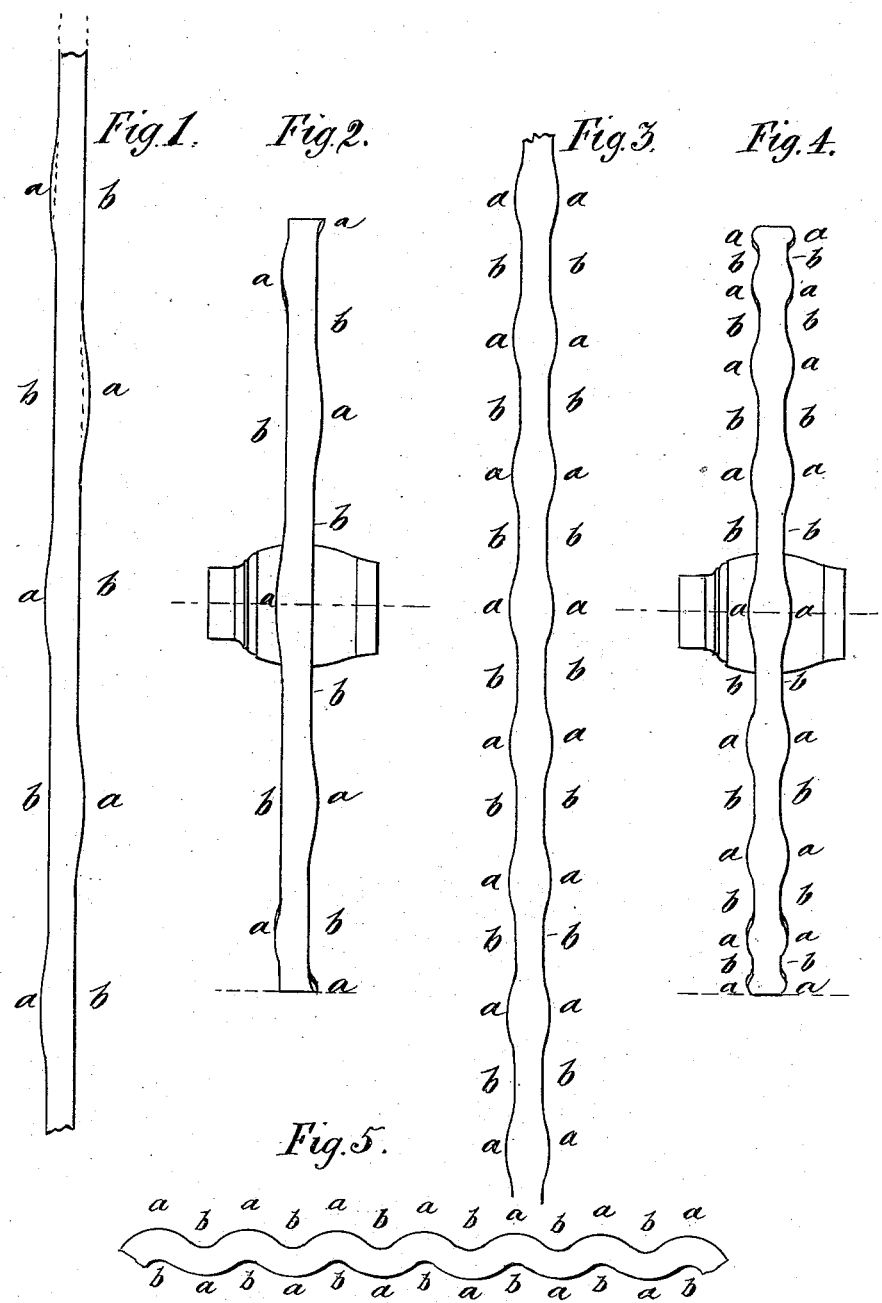
Witnesses
Thos E Craven
Frank Webster
Inventor.
William Fox

UNITED STATES PATENT OFFICE.

WILLIAM FOX, OF LEEDS, COUNTY OF YORK, ENGLAND.

TIRE FOR VEHICLES.

SPECIFICATION forming part of Letters Patent No. 375,281, dated December 20, 1887.

Application filed April 13, 1886. Serial No. 198,742. (No model.)

*To all whom it may concern:*

Be it known that I, WILLIAM FOX, a subject of the Queen of Great Britain and Ireland, residing at Leeds, in the county of York, Kingdom of Great Britain and Ireland, have invented new and useful Improvements in Tires for Wheels of Road-Vehicles, of which the following is a specification.

The wheels of carriages, cabs, and other road-vehicles, when passing along roads where tramways are laid, are, by reason of their narrowness, apt to take into the grooves of tram-rails, and when running in the direction of such rails may be considered to be safe; but immediately the vehicle is required to turn to one side or the other a source of danger arises which often results in an axle being broken or the occupants of the vehicle being thrown therefrom into the road, or both these results may occur.

Now the object of this invention is to obviate the above danger by an improved form of tire, at both sides of which lateral projections are provided at intervals, the projections at one side being by preference opposite spaces between the projections at the other side. The periphery of the tire when the projections at one side are opposite the spaces at the other side presents a kind of zigzag configuration; but whether the projections be arranged as described or with those at one side of the tire opposite those at the other side, in either case there is produced the equivalent of a broader tire or tread than obtains with a narrow tire of ordinary construction, and this additional width is obtained with a very slight addition in weight.

Vehicles having their wheels provided with my improved tires will be enabled to run with greater safety in a direct line upon or to turn off tram-rails without risk of the peripheries of the wheels becoming wedged in the grooves of the rails. The tires will also preserve the fellies of the wheels from being chafed by curbstones or other projecting objects with which the wheels would be liable to come into contact if provided with ordinary narrow tires.

Figure 1 of the annexed drawings represents a developed tire according to my invention, made with the projections *a* of one side opposite the spaces or parts *b* between the projections *a* of the other side, so as to present a zigzag base, and Fig. 2 is an edge view of a wheel with a tire so formed. Fig. 3 shows a modification of tire-bar in which the projections *a* are opposite each other, and Fig. 4 an edge view of a wheel with tire of this form. Fig. 5 also represents a tire-bar arranged to form alternate projections *a* and recesses *b* at both sides of a wheel, as in Figs. 1 and 2, and which can be made by bending a straight parallel bar edgewise to the form shown.

These tires are to be fitted upon circular fellies not wider than the narrowest part of the tire, and the projections of the tire upon either side are, as shown, of the same thickness as the tire itself. The form shown in Figs. 1 and 2 is the preferable form. It will be observed in this form that the overhanging projections of the tire are formed in gentle curves and are opposite straight portions of the other side of the tire, which is the feature of value in my invention. A dotted line shows the protection of the felly within the tire.

I am aware of the United States patent to Pettibone of November 22, 1870, No. 109,447, and to Carpenter of August 13, 1878, No. 207,012, and of the English Patent No. 863 of 1865, and do not claim the subject-matter therein shown.

What I claim is—

1. The combination of a wheel having a flat circular felly and a wheel-tire applied directly to said felly, and as wide at its narrowest part as said felly, and provided with alternate projections and recesses at both its edges, substantially as described.

2. The improved wheel-tire herein shown, which consists of a tire having at both its edges overhanging curved projections opposite corresponding straight edges of the tire, the said curved projections coming into the straight portions by gradual and easy curves, substantially as described.

WILLIAM FOX.

Witnesses:
    THOS. E. CRAVEN, C. E.,
*Fel. Inst. Patent Agents,* 24 *Victoria Chambers, Leeds.*
    FRANK WEBSTER,
        96 *Westfield Road, Leeds.*